(12) United States Patent
Santoro et al.

(10) Patent No.: US 11,587,375 B2
(45) Date of Patent: Feb. 21, 2023

(54) WIRELESS COMMUNICATION DEVICES

(71) Applicant: Webfleet Solutions B.V., Amsterdam (NL)

(72) Inventors: Gianfranco Santoro, Amsterdam (NL); Henrik Schiller, Amsterdam (NL); Alexander Schmidt, Amsterdam (NL); Christian Meissner, Amsterdam (NL); Thomas Hagenau, Amsterdam (NL); André Pomsel, Amsterdam (NL); René Liebscher, Amsterdam (NL)

(73) Assignee: Bridgestone Mobility Solutions B.V., Amsterdam (NL)

( * ) Notice: Subject to any disclaimer, the term of this patent is extended or adjusted under 35 U.S.C. 154(b) by 511 days.

(21) Appl. No.: 16/314,407

(22) PCT Filed: Jun. 20, 2017

(86) PCT No.: PCT/EP2017/065140
§ 371 (c)(1),
(2) Date: Dec. 29, 2018

(87) PCT Pub. No.: WO2018/001800
PCT Pub. Date: Jan. 4, 2018

(65) Prior Publication Data
US 2019/0156597 A1 May 23, 2019

(30) Foreign Application Priority Data
Jun. 30, 2016 (GB) ...................................... 1611520

(51) Int. Cl.
*G07C 5/08* (2006.01)
*G07C 5/00* (2006.01)
(Continued)

(52) U.S. Cl.
CPC ............. *G07C 5/085* (2013.01); *G01C 22/00* (2013.01); *G01C 22/006* (2013.01); *G07C 1/10* (2013.01); *G07C 5/008* (2013.01)

(58) Field of Classification Search
None
See application file for complete search history.

(56) References Cited

U.S. PATENT DOCUMENTS 6,856,933 B1 * 2/2005 Callaghan .............. G01C 22/02
702/122
9,292,982 B1 * 3/2016 Higgs .................... G07C 5/008
(Continued)

FOREIGN PATENT DOCUMENTS

CN          104995485 A      10/2015
FR          2757269 A1 *     6/1998 ............. G01C 22/02

OTHER PUBLICATIONS

French-to-English Translation of FR 2757269 A1 (Year: 1996).*
(Continued)

*Primary Examiner* — Thomas E Worden
(74) *Attorney, Agent, or Firm* — Patterson Intelletual Property Law, P.C.

(57) ABSTRACT

A method of operating a wireless communication device installed in a vehicle to transmit data indicative of trips made by the vehicle to a remote device. An ignition state of the vehicle is determined, wherein said ignition state includes at least an ignition 'on' state. A time window is defined based on a time at which the vehicle is determined to be in the ignition 'on' state, and a type is assigned to a trip to be made by the vehicle, wherein the trip is of a first type when input data indicative of an input by a user on an input device operatively connected to the wireless communication device is received in the defined time window, and is otherwise of a second type. A message is generated, at least for trips of the (Continued)

first type, indicating the type assigned to the trip, and is wirelessly transmitted to the remote device.

17 Claims, 5 Drawing Sheets

(51) Int. Cl.
*G01C 22/00* (2006.01)
*G07C 1/10* (2006.01)

(56) References Cited

U.S. PATENT DOCUMENTS

| | | | | |
|---|---|---|---|---|
| 9,417,078 B1* | 8/2016 | Seibert | ............... | G07C 5/0858 |
| 2003/0117298 A1* | 6/2003 | Tokunaga | ............... | H04L 67/56 |
| | | | | 340/989 |
| 2009/0045984 A1* | 2/2009 | Tunnell | ............... | G07C 5/085 |
| | | | | 340/988 |
| 2011/0112717 A1* | 5/2011 | Resner | ............... | G07C 5/085 |
| | | | | 701/31.4 |
| 2014/0011483 A1* | 1/2014 | Baumert | ............... | G07C 5/008 |
| | | | | 455/414.1 |
| 2014/0058801 A1* | 2/2014 | Deodhar | ............... | G06Q 10/0639 |
| | | | | 705/7.38 |
| 2015/0187147 A1* | 7/2015 | Tieman | ............... | G07C 5/08 |
| | | | | 701/33.2 |
| 2016/0350984 A1* | 12/2016 | Tieman | ............... | G07C 5/008 |
| 2017/0200197 A1* | 7/2017 | Brubaker | ............... | G06Q 30/0241 |
| 2020/0410867 A1* | 12/2020 | Verheijen | ............... | G01C 21/3453 |

OTHER PUBLICATIONS

The State Intellectual Property Office of People's Republic of China : Office action in corresponding Chinese Patent Application No. 201780047967.7 dated Sep. 17, 2020, 10 pages (machine translated).

Search Report for International Application No. PCT/EP2017/065140 dated Sep. 27, 2017.

* cited by examiner

Trip report (logbook)

Period: Sun 02/09/2012 – Sun 09/09/2012
Vehicle: 230 - ServiceCar

Vehicle details

| VIN | License plate | Vehicle type | Vehicle ID | Registration date |
|---|---|---|---|---|
| 230 - ServiceCar | L-TT 1234 | car | LC9863G12312 | 09/06/2011 |

| Start odometer / End odometer | | | | Odometer corrections: Odometer correction mileage: |
|---|---|---|---|---|

| Date | Start time / End time | Start location / End location | Trip type / Contact | Purpose / Comments | Driver | Distance / Duration |
|---|---|---|---|---|---|---|
| 230 - ServiceCar | | Business trips: 5<br>Way to work trips: 3<br>Private trips: 8 | Business mileage: 404.9 km<br>Way to work mileage: 49.1 km<br>Private mileage: 129.8 km | | | |
| Mon 03/09 | 07:25 | 2,695 km<br>2,696 km | Lessingstraße 20, Leipzig<br>Schillerstraße 5, Leipzig | Commutation to work | | Peter F. | 1.5 km<br>4 min |
| Mon 03/09 | 07:36<br>07:40 | 2,696 km<br>2,698 km | Schillerstraße 5, Leipzig<br>Lessingstraße 20, Leipzig | Business | Refuel car | Peter F. | 1.9 km<br>4 min |
| Tue 04/09 | 07:29<br>07:33 | 2,698 km<br>2,700 km | Lessingstraße 20, Leipzig<br>Schillerstraße 5, Leipzig | Commutation to work | | Peter F. | 1.5 km<br>4 min |
| Tue 04/09 | | 2,700 km<br>2,702 km | | Private trip | | Peter F. | 2.0 km<br>5 min |
| Wed 05/09 | 07:29<br>08:19 | 2,702 km<br>2,728 km | Lessingstraße 20, Leipzig<br>Grabenweg 2, Eilenburg | Business<br>John D. | Mayers GmbH, customer visit | Peter F. | 25.8 km<br>50 min |
| Wed 05/09 | 15:32 | 2,728 km<br>2,910 km | Grabenweg 2, Eilenburg<br>Lehmannstraße 15, Dresden | Business<br>Silvia K. | Intelligent Electro Inc., vendor | Peter F. | 182.9 km<br>1 h 59 min |
| Wed 05/09 | 17:31 | 2,910 km<br>2,980 km | | Private trip | | Peter F. | 69.1 km<br>51 min |
| Fri 07/09 | 08:47<br>09:09 | 2,980 km<br>2,990 km | Lehmannstraße 15, Dresden<br>Fritz-Reuter-Straße 62, Dresden | Business<br>Peter V. | Perfelectro Co. KG, initial installation and training | Peter F. | 10.9 km<br>22 min |
| Fri 07/09 | 09:13<br>10:58 | 2,990 km<br>3,174 km | Fritz-Reuter-Straße 62, Dresden<br>Lauterberger Straße 34, Berlin | Business<br>Regional sales team | Freight and Fright Inc., device replacement | Peter F. | 183.4 km<br>1 h 45 min |
| Fri 07/09 | 11:04<br>11:53 | 3,174 km<br>3,220 km | Lauterberger Straße 34, Berlin<br>Schillerstraße 5, Leipzig | Commutation to work | | Peter F. | 46.1 km<br>49 min |
| Fri 07/09 | | 3,220 km<br>3,224 km | | Private trip | | Peter F. | 4.3 km<br>12 min |
| Sat 08/09 | | 3,224 km<br>3,271 km | | Private trip | | Peter F. | 46.6 km<br>1 h 05 min |
| Sat 08/09 | | 3,271 km<br>3,273 km | | Private trip | | Peter F. | 1.8 km<br>6 min |

Figure 6

WIRELESS COMMUNICATION DEVICES

CROSS-REFERENCE TO RELATED APPLICATIONS

The present application is a National Stage of International Application No. PCT/EP2017/065140, filed on Jun. 20, 2017, and designating the United States, which claims benefit to United Kingdom Patent Application 1611520.6 filed on Jun. 30, 2016. The entire content of these applications is incorporated herein by reference.

FIELD OF THE INVENTION

The present invention relates to wireless communication devices for determining and transmitting data indicative of trips made by a vehicle to a remote device, and associated methods of determining and transmitting such data in such wireless communication devices.

BACKGROUND OF THE INVENTION

It is a common requirement in many countries to log the distance (also referred to as mileage) travelled by a vehicle that is used as part of a business. For example, the tax authorities of a country often require at least the business (or employer), and typically both the business and the driver (or employee), to record and declare both the business and private mileage driven by the vehicle. To facilitate this requirement many vehicles used for business are provided with hardware devices (also called telematics devices) supplied from various telematics service providers that are often connected to the vehicle, such as through a wired connection to the vehicle CAN bus or plugged into the vehicle's on-board diagnostic (OBD) port, and which can collect and record mileage data for trips taken by the vehicle. An example form of telematics device is the LINK range of products supplied by TomTom Telematics. This mileage data can be easily validated by a driver, e.g. directly using the hardware device installed in the vehicle or using a software application (or "app") running on a mobile device, such as a smartphone, that is operatively connected to the hardware device, before being sent to fleet management system of the business. This type of functionality is often referred to as "logbook functionality".

Many telematics devices include functionality for automatically detecting the start and end of trips, which when combined with the functionality of obtaining accurate mileage data on the distance travelled by the vehicle during each trip, e.g. from the odometer of the vehicle and/or using a position determining device within the telematics device, such as a global navigation satellite system (GNSS) device, results in the driver only needing to provide information about the type of trip, i.e. whether it was for a 'business' reason or for a 'private' reasons to meet the minimum legislative requirements. Of course many automated logbooks supplied by telematics service providers also allow the driver to provide additional details about a trip, such as the: purpose of the trip (e.g. weekly sales meeting, meeting with Company X, etc); the location (or addresses) of the start and/or end of the trip; and contact details of a person or company associated with the trip. An example of such enhanced logbook functionality is the TomTom WEBFLEET Logbook app supplied by TomTom Telematics.

Even though automated logbooks only require a driver, as a minimum, to identify the type of trip that is to be driven, or has been driven, it has been recognised that it would still be beneficial to reduce even further the number of interactions that the driver is required to make with the telematics device or associated app in order to identify the type of trip. Accordingly, there remains a need for an improved wireless communication device providing logbook functionally.

SUMMARY OF THE INVENTION

In accordance with a first aspect of the present invention there is provided a method of operating a wireless communication device installed in a vehicle to transmit data indicative of trips made by the vehicle to a remote device, the method comprising:

determining an ignition state of the vehicle, wherein said ignition state includes at least an ignition 'on' state;

defining a time window based on a time at which the vehicle is determined to be in ignition 'on' state;

assigning a type to a trip to be made by the vehicle, wherein the trip is of a first type when input data indicative of an input by a user on an input device operatively connected to the wireless communication device is received in the defined time window, and is otherwise of a second type;

generating a message, at least for trips of the first type, indicating the type assigned to the trip; and wirelessly transmitting the generated message to the remote device.

The present invention extends to a system, e.g. a wireless communication device comprising one or more processors, for carrying out a method in accordance with any of the aspects or embodiments of the invention herein described. As discussed in more detail below, the system may further include the input device that is operatively connected to the wireless communication device, e.g. using a wired or wireless connection.

Thus, in accordance with another aspect of the invention, there is provided a wireless communication device installable in a vehicle, comprising:

a processor arranged to:
  determine an ignition state of the vehicle, wherein said ignition state includes at least an ignition 'on' state;
  define a time window based on a time at which the vehicle is determined to be in the ignition 'on' state;
  assign a type to a trip to be made by the vehicle, wherein the trip is of a first type when input data indicative of an input by a user on an input device operatively connected to the wireless communication device is received in the defined time window, and is otherwise of a second type;
  generate a message, at least for trips of the first type, indicating the type assigned to the trip; and
a wireless transmitter for communicating with a remote device, wherein the wireless transmitter is arranged to wirelessly transmit the generated message to the remote device.

The present invention is a computer implemented invention, and any of the steps described in relation to any of the aspects or embodiments of the invention may be carried out by a set of one or more processors that execute software comprising computer readable instructions stored on a non-transitory computer readable medium. In other words, the methods in accordance with the present invention may be implemented at least partially using software, e.g. computer programs. The present invention this also extends to a computer program comprising computer readable instructions executable to perform a method according to any of the aspects or embodiments of the invention.

The invention thus also extends to a computer software carrier comprising software which when used to operate a system or apparatus comprising data processing means causes, in conjunction with said data processing means, said apparatus or system to carry out the steps of the methods of the present invention. Such a computer software carrier could be a non-transitory physical storage medium, such as a ROM chip, CD ROM or disk, or could be a signal, such as an electronic signal over wires, an optical signal or a radio signal such as a satellite or the like.

As will be appreciated by those skilled in the art, these further aspects of the present invention can, and preferably do, include any one or more or all of the preferred and optional features of the invention described herein in respect of any of the other aspects of the invention, as appropriate. Accordingly, even if not explicitly stated, the system of the present invention may comprise means for carrying out any step described in relation to the method of the invention in any of its aspects or embodiments, and vice versa.

The present invention is concerned with methods and systems for transmitting data indicative of trips made by a vehicle to a remote device, such as a server of a telematics service provider, using a wireless communication device installable in the vehicle. As will be discussed in more detail below, the wireless communication device could be connected through a wired connection to the CAN bus of the vehicle, or could comprise a connector for connecting the device to an on-board diagnostics (OBD) port of the vehicle. The data indicative of trips is preferably for use in filling in a logbook for the vehicle, and allows the type of each trip made by the vehicle to be determined and recorded, i.e. whether the trip is 'private' or 'business'. The type of trip can be used to change the information that is recorded in the logbook. For example, while the logbook will typically include the distance travelled during a trip for both types of trip, 'business' trips will often include additional information such as the start and end locations of the trip, the purpose of the trip, a contact person or business associated with the trip, etc. This is illustrated, for example, in FIG. 6. The present invention permits, at least in preferred embodiments, a user, e.g. driver of a vehicle, to indicate the type of trip, specifically through indicating whether a trip is a 'private' trip, with a single input on an input device, such as a button.

In the present invention, the wireless communication device is arranged to determine an ignition state of the vehicle. The ignition state includes an ignition 'on' state, and preferably also an ignition 'off' state. As will be appreciated, the determination of the ignition state preferably comprises determining the transition from an ignition 'off' state to an 'on' state, and in embodiments also determining the transition from the ignition 'on' state to the 'off' state. The ignition state of the vehicle preferably refers to the status of an ignition switch (or system) of the vehicle that is arranged to at least activate one or more electrical systems of the vehicle. The activation of the one or more electrical systems of the vehicle can refer to the provision of power to one or more electrical accessories in the vehicle, such as a radio, navigation system, power windows, etc. The ignition switch can, in embodiments, also be connected to the starter system of the vehicle, and is thus further arranged to activate a starter motor so as to start an engine, e.g. internal combination engine, of the vehicle. In such embodiments, the ignition state further includes an engine 'on' state, which is reached from the ignition 'on' state. In other words, detection of the engine 'on' state inherently means that the ignition switch of the vehicle has passed through the ignition 'on' state.

The determination of the ignition 'on' state, in embodiments where the device is installed in the vehicle so as to be communicably connected to the ignition switch of the vehicle, can comprise receiving a signal from the ignition switch indicating the ignition state of the vehicle. In other embodiments, e.g. where the device is not communicably connected to the ignition switch, but for example comprises a connector such that the device can be installed in an on-board diagnostics (OBD) port of the vehicle, the transition to an ignition 'on' state can be detected indirectly, e.g. by monitoring a voltage at the connector. For example, the ignition 'on' state can be detected from the voltage exceeding a predetermined threshold. The threshold may be at least 13 volts (V), preferably around 13.2 V. Therefore, in some embodiments, the processor is arranged to detect the ignition state of the vehicle by sampling the voltage at the connector at a frequency of at least 4 Hz, 5 Hz, 6 Hz, 7 Hz, or 8 Hz.

In some embodiments, for example when the device is installed in the OBD port of the vehicle, the determination that the vehicle is in the ignition 'on' state can be made by detecting that the vehicle is in the engine 'on' state. In other words, if the engine of the vehicle is running, then this is in most situations an indication that the transition from ignition 'off' to ignition 'on' has occurred. In such embodiments, engine state detection methods such as described in WO 2016/024023 A1, the entire content of which is incorporated herein by reference. For example, the engine 'on' state can be detected from at least one of: the voltage exceeding a predetermined threshold; and a temporary voltage drop of at least a predetermined magnitude. The detection of the temporary voltage drop allows the device to function in modern vehicles that use "smart charging" technology. As will be appreciated "smart charging" technology is a form of regulated voltage control that uses system information to optimise the voltage supplied to the battery. As discussed in WO 2016/024023 A1, the entire content of which is incorporated herein by reference, in order to reliably detect a true engine 'on' state, the processor in the wireless communication device detects a temporary voltage drop rather than simply comparing the voltage level at the connector to an absolute threshold, e.g. 13.2 V. In a set of embodiments the processor detects an engine 'on' state from a temporary voltage drop of a predetermined magnitude, e.g. at least 2 volts, that lasts for a time period of less than 1 second. Preferably the processor detects an engine 'on' state from a temporary voltage drop of a predetermined magnitude, e.g. at least 2 volts, that lasts for a time period of at least 400 ms and less than 1 s. Further preferably the processor detects an engine 'on' state from a temporary voltage drop of at least 3 volts. Since the temporary voltage drop may appear only as a brief "spike" in the detected voltage level, the processor must be able to distinguish this from other, typically smaller, changes in the voltage level, e.g. resulting from "smart charging".

As discussed above, the step of determining the ignition state of the vehicle can further include determining when the vehicle is in an ignition 'off' state, and preferably the transition from the ignition 'on' state to the ignition 'off' state. The determination of the ignition 'off' state, in embodiments where the device is installed in the vehicle so as to be communicably connected to the ignition switch of the vehicle, can comprise receiving a signal from the ignition switch indicating the ignition state of the vehicle. In other embodiments, e.g. where the device is not communicably connected to the ignition switch, but for example comprises a connector such that the device can be installed in an on-board diagnostics port (OBD) port of the vehicle, the transition to an ignition 'off' state can be detected indirectly, e.g. by monitoring a voltage at the connector. For example, the ignition 'off' state can be detected from the voltage value, or average voltage value, being less than a predetermined threshold, and preferably being less than the predetermined threshold for more than a predetermined period of time. The threshold may be at least 13 V, preferably around 13.2 V. The predetermined period of time may be at least 1 second (s) or 2 s, and preferably at least 3 s.

The present invention further includes determining the start and end of trips of the vehicle. The term "trip" in this context refers to a journey made by the vehicle having a single purpose. Therefore, for example, the trip may include one or more short breaks, such as to get a coffee, to refill the fuel tank of the vehicle, etc, since such stops or breaks do not cause the purpose of the trip to be changed. As will be discussed in more detail below, each trip starts when the ignition is turned 'on' and ends when the ignition is turned 'off', but due to the requirement to prevent short breaks from starting new trips, it will be appreciated that a new trip may not be started each time the ignition is turned 'on'.

In embodiments, a new trip can be determined to have started (only after a previous trip has ended) based on a two-stage process. In a first stage, a possible new trip is detected when the ignition state is determined to transition to ignition 'on', and in a second stage the possible new trip is preferably confirmed when the ignition system of the vehicle remains in an 'on' state for more than a predetermined period of time, e.g. for 5 minutes (although this value is merely exemplary) and/or when the vehicle is determined to move. In some embodiments, a selection of the predetermined period of time can be made at the remote device, e.g. a server of a telematics service provider, and a message indicative of the selected time period being transmitted from the remote device to the wireless communication device. The determination that the vehicle is moving can be based on data relating to vehicle speed and/or engine revolutions. Such data can, for example, be OBD data, i.e. obtained through the connector over the OBD port. Additionally, or alternatively, motion of the vehicle can be detected by monitoring data from an acceleration sensor and/or a position determining device, such as a global navigation satellite systems (GNSS) receiver, of the wireless communication device.

In embodiments, a trip can be determined to have ended when the vehicle remains stationary for more than a predetermined period of time, e.g. for 5 minutes (although this value is merely exemplary) and/or when the ignition system of the vehicle remains in an 'off' state for more than a predetermined period of time, e.g. for 5 minutes (although again this value is merely exemplary). As will be appreciated, the end of trip is also preferably determined based on a two-stage process. In a first stage, a possible end of the current trip is detected by the vehicle being stationary and/or the ignition system transitioning to an 'off' state, and in a second stage the possible end of the trip is preferably confirmed when the vehicle is stationary and/or has an ignition 'off' state for more than a predetermined period of time. In some embodiments, a selection of the predetermined period of time associated with the vehicle being stationary and/or the vehicle being in the ignition 'off' state can be made at the remote device, e.g. a server of a telematics service provider, and a message indicative of the selected time period being transmitted from the remote device to the wireless communication device.

In the present invention, a time window is defined based on a time at which the vehicle is determined to be in the ignition 'on' state. The time at which the vehicle is determined to be in the ignition 'on' state preferably is the time at which the vehicle transitions from the ignition 'off' state to the ignition 'on' state. As is discussed in more detail below, the defined time window is used in the present invention to assign a type to a trip to be made by the vehicle. The trip is of a first type, e.g. is associated with an identifier indicative of a first trip type, when input data indicative of an input by a user on an input device operatively connected to the wireless communication device is received in the defined time window. If no such input data is received, then the trip is of a second type, e.g. is associated with an identifier indicative of a second trip type. In other words, a trip is said to be a first type when input data from the user is received during the time window, but any other trip is a second type (different from the first type), i.e. the second type can be thought of as the default type. Accordingly, as will be appreciated, a user is only required to provide an input if a trip of the first type is to be undertaken, otherwise no interaction is required. Thus the need for user interaction is reduced.

In preferred embodiments, the first type of trip is a 'private' trip and the second type of trip is a 'business' trip. Although it is envisaged that opposite may also be in the case, e.g. with the first type of trip being a 'business' trip and the second type of trip being a 'private' trip. In some embodiments, a selection of which one of the first and second trip types is 'private' and which is 'business' can be made at the remote device, e.g. a server of a telematics service provider, and a message indicative of the selection being transmitted from the remote device to the wireless communication device. Thus, the operation of the wireless communication device may be easily changed, i.e. reversed, by changing the selection at the remote device.

The wireless communication device is operatively connected to an input from which an input from a user, e.g. driver of the vehicle, can be received. The input device can be connected to the communication device via a wired or wireless connection. The input device can be a hardware button or a touch control sensor. In preferred embodiments, the input data comprises a signal indicating that the user actuated the input device, e.g. such that the method performed on the wireless communication device is controlled by a single push button (or other input device).

The time window is defined based on a time at which an ignition 'on' state is determined. The time window may start from the time at which the ignition 'on' state is determined (e.g. the transition from ignition 'off' to 'on'), and extend for a predetermined fixed period of time, e.g. 60 seconds (although this value is merely exemplary). In other embodiments, the time window may extend for a predetermined fixed period of time both before and after the time at which ignition 'on' state is determined. In yet further embodiments, the time window may extend for a dynamic (or variable) period of time from the time at which the ignition 'on' state is determined, e.g. the time window ends when the vehicle begins to move. In some embodiments, both fixed and dynamic time windows can be used, such that, for example, the time window can extend up to a predetermined maximum period of time from the time at which the ignition 'on' state is determined, but the window will be closed earlier than this maximum time if the vehicle begins to move.

In a first set of embodiments, the time window may be defined each time the ignition 'on' state is detected. These embodiments allow for a device that is more tolerant to situations where the user provides a user input by mistake. For example, if the user accidently assigns a trip as being of the first type, e.g. private, then the user simply needs to turn the ignition off and back on again in order to correct their error. In these embodiments, the time window is preferably a predetermined period of time that extends at least from the time at which the ignition 'on' state is detected, and in some embodiments also for a period of time before this time.

The wireless communication device is typically powered in normal use by the vehicle, e.g. via the vehicle OBD port, but thus preferably enters a 'sleep' mode when the ignition switch of the vehicle is in an 'off' state such that the electrical systems are not being provided with power. In this sleeping mode the device does not take power from the vehicle, and thus does not drain the vehicle's battery. In other words, the detection of an ignition 'on' state may act to awaken the wireless communication device from a sleeping mode and cause a transition to a running mode. Thus, in some embodiments, the device wakes from this sleeping mode at the time the ignition 'on' state is detected. In some embodiments, however, the wireless communication may further comprise a battery for proving power to the device even when in 'sleep' or when not connected to power, e.g. for powering a memory and/or real-time clock within the device. In such embodiments, should a user, e.g. driver of the vehicle, provide an input on the input device when the wireless communication device is in sleep mode, then the time at which the input is received can be stored in memory, and used to determine, when the device wakes up, if the input was received in a predetermined period of time before the time at which the ignition 'on' state is detected.

In a second set of embodiments, the time window may be defined only for selected detected ignition 'on' states, such as when an ignition 'on' state is detected when there is no active trip. At other times when the ignition 'on' state is detected, e.g. the transition thereto, then a time window is not defined. These embodiments can reduce user interaction even further, but are less tolerant to situations where the user provides a user input by mistake. For example, if the user accidently assigns a trip as being private, then the user needs to wait for the predetermined period of time for the current trip to be ended, e.g. as discussed above. In these embodiments, the time window preferably extends up to a predetermined maximum period of time from the time at which the ignition 'on' state is determined, but will be closed earlier than this maximum time if the vehicle begins to move.

In embodiments of the invention, the wireless communication device can comprise one or more output devices, such as at least one LED or other visual indicator, a speaker or other audible indicator, that can be used to indicate to the user at least one of: (i) some or all of the time window during which input data can be received to assign a first type of trip; and (ii) the type of the current trip. For example, the one or more output devices could provide a first output, such as blinking an LED, sounding a beeping noise, etc, to act as a prompt that the device is arranged to receive input data to assign a first type of trip, e.g. a private trip. Additionally or alternatively, the one or more output devices could provide a second output, such as the LED being 'on', to indicate that the current trip is a first type of trip. Thus if the LED if 'off', then the user knows that the current trip is a second type of trip, e.g. a business trip. In some embodiments, the one or more output devices are arranged to be operational only when the wireless communication devices wakes from sleeping mode. Therefore, in such embodiments, the one or more output devise can only be used to indicate some of the time window, since the time window could encompass a time before the ignition 'on' state is detected and the device wakes up from 'sleep' mode.

In embodiments of the present invention, the method can further comprise, when input data is received during a trip of the second type, e.g. a business trip, then the current trip is ended and a new trip started that is assigned the first type, e.g. a private trip.

In the present invention, a message is generated, at least for trips of the first type, indicating the type assigned to the trip, which is then transmitted to a remote device using a wireless transmitter of the wireless communication device. In embodiments, and as discussed above, the remote device preferably comprises a server of a telematics service provider. The wireless transmitter of the wireless communication device can be arranged to communicate with the remote device, e.g. server, using the mobile telecommunications network. In other embodiments, the wireless transmitter can communicate with a mobile telecommunications device, such as a smartphone, using a short-range wireless protocol such as Bluetooth, and the messages can be sent to the server using the mobile telecommunications device.

In embodiments, a message is generated by the wireless telematics device at least to indicate that a new trip has been started. This message may be generated at the detection of a transition to an ignition 'on' state, or after a possible trip has been confirmed in the manner discussed above. The message may include data indicating the type assigned to the trip, or this data may be provided in a separately generated message. As will be appreciated, a message with data indicating the type assigned to a trip may only be generated for those trips of the first type. This is because the telematics service provider can assume that if a message indicating a trip is private is not received, then the trip must inherently be a business trip. Alternatively, a message with data indicating the type assigned to a trip may be generated for all trips regardless of type.

The wireless communications device is preferably arranged to determine data indicative of the distance travelled by the vehicle (in which the device is installed) during a trip, and to transmit this determined data to the remote device, e.g. in the form of one or more messages. For example, in embodiments where the device has access to the odometer of the vehicle, the device may provide to the remote device the odometer value at the start of a trip and the odometer value at the end of the trip, or the difference therebetween, such that the trip distance can be associated with the trip in the logbook. In embodiments where the device does not have access to the odometer of the vehicle, data indicative of the distance travelled by the vehicle can be determined from a position determining device, such as a GNSS receiver, in the wireless communication device. Preferably the data indicative of the distance travelled by the vehicle during a trip is transmitted to the remote device, e.g. server, for both trips of the first type (e.g. private) and second type (e.g. business).

The assignment of a trip as a first type or second type can, in embodiments, change the data that is sent to the remote device from the wireless communication device. For example, in embodiments where the wireless communication device includes or is operatively connected to a position determining device, such as a GNSS receiver, the position of the device during a trip of the second type can be periodically transmitted to the remote device, e.g. every 30 seconds or every minute, optionally in associated with temporal data, such as a timestamp, to indicate the movement of the device with respect to time. This data is often referred to as "tracking data", wherein messages forming the tracking data can include one or more positions, e.g. time-stamped positions, and optionally updated odometer values. In embodiments, tracking data is not transmitted to the remote device, e.g. server of the telematics service provider, when a trip is assigned to be a 'private' trip, which, as discussed above, could be either the first trip type or the second trip type. Typically, the amount of data that is transmitted in relation to a 'private' trip is less than that for a 'business' trip, such that the details of the trip remain private.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Some preferred embodiments of the present invention will now be described, by way of example only, and with reference to the accompanying drawings, in which:

FIG. 6 illustrates an exemplary trip report (or logbook) of a vehicle over a week.

DETAILED DESCRIPTION OF THE PREFERRED EMBODIMENTS

Figure 1:
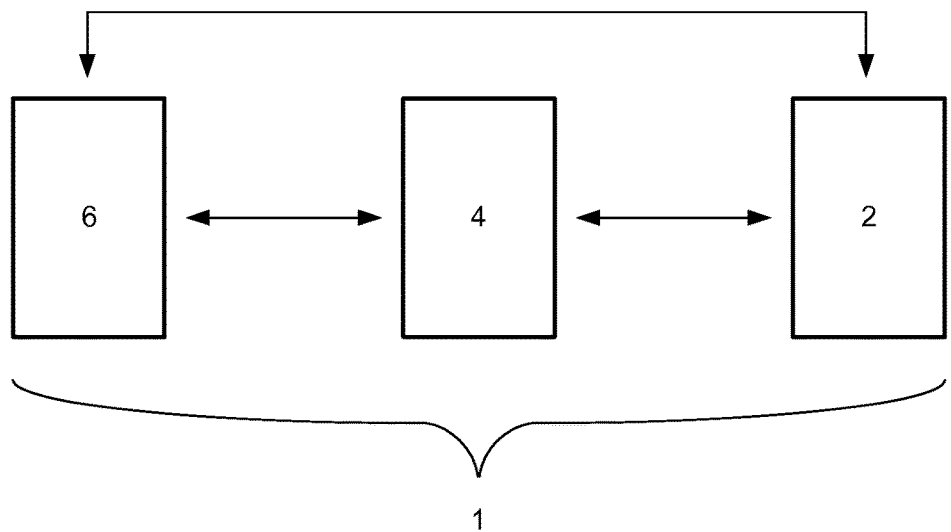
FIG. 1 is a schematic overview of a system for collecting trip data.

From FIG. 1 it will be understood that a collection system 1 for trip data indicative of trips made by a vehicle, including trip type and mileage data, generally comprises a wireless communication device or dongle 2 and an external server 6. It should be appreciated that the term mileage refers to distance travelled by a vehicle. Such distance may include values from different forms of metric systems. The system may also include a mobile telecommunications device such as a smartphone 4. The dongle 2 collects the trip data, but data transmission to the external server can occur directly or indirectly using a user's smartphone 4. The dongle 2 may pair with the smartphone 4 using Bluetooth or other short-range wireless communication protocol. Long-term storage of the trip data, for example in the form of a logbook, is provided by the external server 6 so as to ensure data security and integrity.

Figure 2:
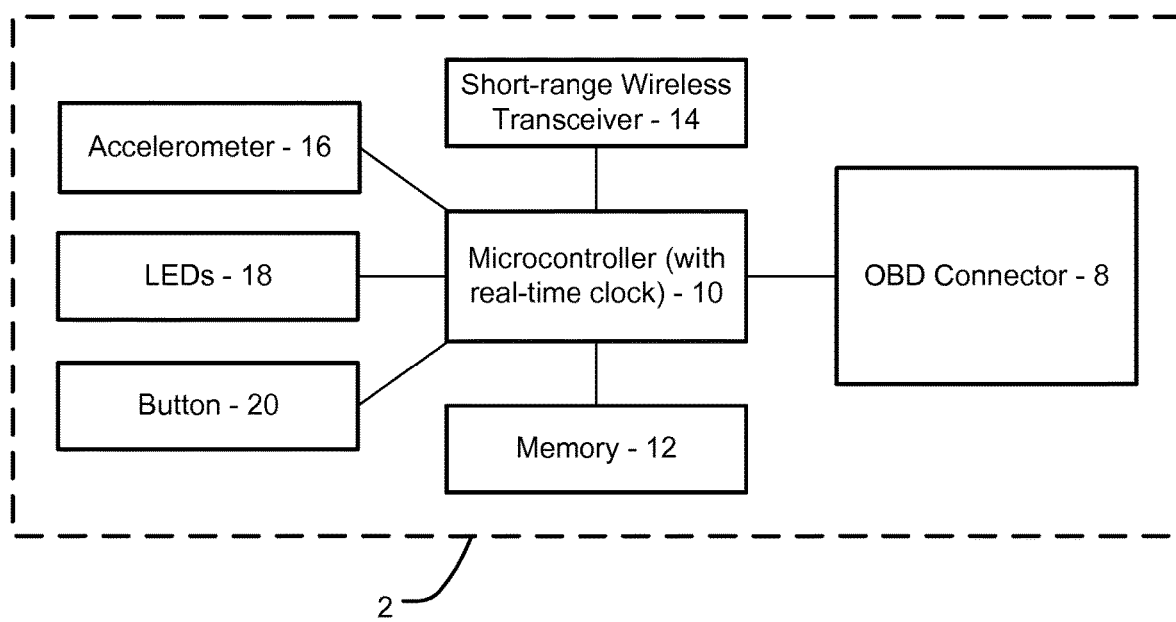
FIG. 2 is a block diagram of a first exemplary wireless communication device for use in the system of FIG. 1.

An exemplary wireless communication device or dongle 2 is seen from FIG. 2 to include a physical connector 8 that can mate with a vehicle OBD port to receive OBD data and power. The internal components of the dongle 2 comprise a processor 10 (such as a microcontroller), which includes a real-time clock, a memory 12 (such as a flash memory), a wireless (e.g. Bluetooth) transceiver 14, an optional accelerometer 16, one of more LEDs or other indicators 18, and a button 20. The button 20 can be integral to the dongle 2 or can be operatively connected thereto using a wireless connection. As described in more detail below, the button 20 can be used by the driver to indicate whether a trip is for 'business' or 'private' reasons. The state of the ignition system of the vehicle can be determined in the device by monitoring the voltage at the connector 8. In particular, the ignition of the vehicle can be detected as being 'on' when the voltage exceeds a predetermined threshold value, such as 13.2 V.

Figure 3:
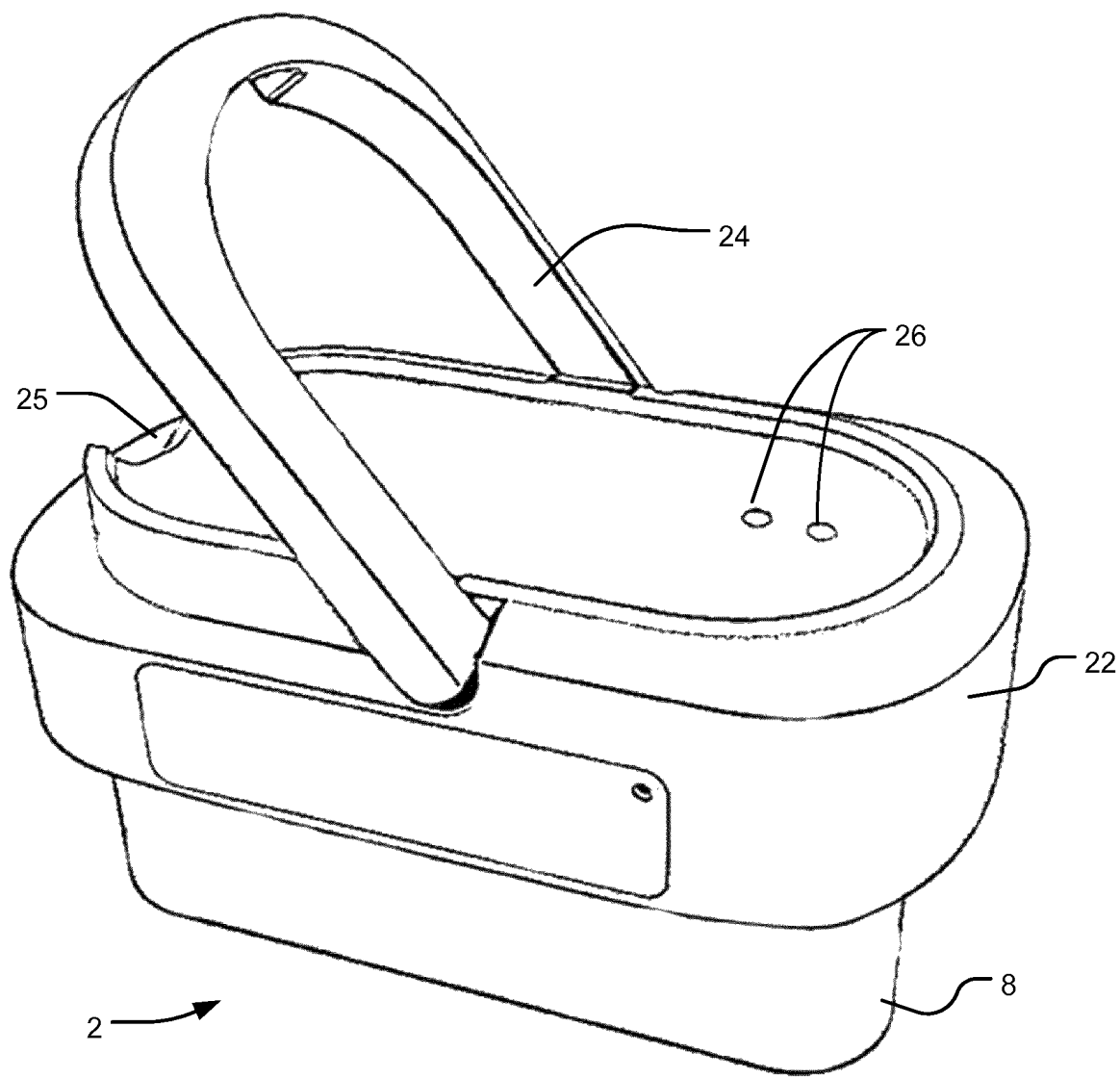
FIG. 3 illustrates a possible physical embodiment of a wireless communication device in accordance with FIG. 2.

A possible physical embodiment of such a dongle 2 is shown in FIG. 3. In FIG. 3 the dongle 2 has the connector 8 integrated with a housing 22 for the internal components. A handle 24 is hingedly connected to the housing 22 so that a user can easily remove the dongle 2 by lifting the handle 24 to pull the connector 8 out of a vehicle OBD port. The handle 24 is flush with an upper surface of the housing 22 when it is not in use and a fingernail indentation 25 in the housing 22 enables a user to lift the handle 24 up. Two LEDs 26 visible on the upper surface of the housing 22 can inform a user about the status of the dongle 2.

Figure 4:
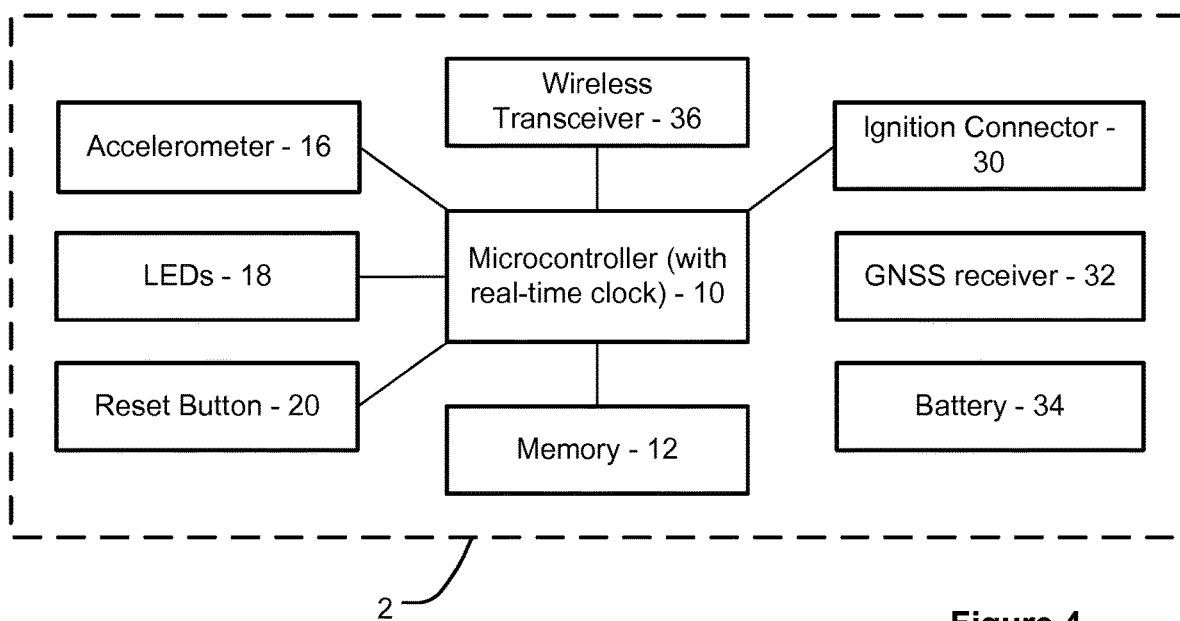
FIG. 4 is a block diagram of a second exemplary wireless communication device for use in the system of FIG. 1.

Another exemplary wireless communication device 2 is shown in FIG. 4. This device is similar to that of FIG. 2, but rather than being designed to be installed in the vehicle's OBD port, the device is arranged to be installed in the vehicle with a connection to the vehicle's CAN bus. The device 2 includes an ignition connector 30 that receives a signal when upon actuation of the ignition system of the vehicle, so as to detect when the ignition switch activates one or more electrical systems in the vehicle. The device 2 further includes a global navigation satellite system (GNSS) receiver 32 for determining the position of the device 2, a battery 34 and the wireless transceiver 36 typically takes the form of a hardware or software SIM such that the device 2 can communicate directly with the external server 6 using the mobile telecommunications network.

The detected ignition state of the vehicle, e.g. based on the voltage on connector 8 in the device of FIGS. 2 and 3, or based on the ignition connector 30 in the device of FIG. 4, can also be used in combination with additional data, such as the vehicle speed and/or engine revolutions and/or pre-determined time periods, to detect when a vehicle begins and ends a trip. In particular, a new trip can be determined to have begun when there is a predetermined period of time between a detected ignition 'off' state and a detected ignition 'on' state, and the vehicle is detected to have begun driving, e.g. based on the vehicle speed and/or engine speed (or revolutions) being greater than zero. The predetermined period of time can be 15 minutes, 30 minutes, 1 hour or 2 hours.

Embodiments of the invention relate to a logbook push button control. Two possible variants are envisaged: (i) an ignition based variant; and (ii) a trip based variant.

In the first variant—the ignition based variant—the wireless communication device includes one push button and one LED. The logbook can be set to PRIVATE via the button at any time, i.e. if the button is pressed during a business trip, the trip will be finished and a new private trip will be started, and it will be automatically reset to BUSINESS in case the user did not press the button after the next ignition ON. The next ignition ON can be inside an active trip, e.g. after a short stop, or it can be the start point of a new trip. The time frame to press the button after ignition ON is valid a fixed time, e.g. 60 seconds. If the button is pressed, the logbook will remain in PRIVATE mode. The LED indicates the private mode (LED is ON), the business mode (LED is OFF), as well as the prompt to press the button after ignition ON in case of PRIVATE mode (LED is blinking). To save vehicle battery current during device sleep mode, it is possible to configure the device, that the LED shall be switched OFF during sleep mode. As soon as the ignition is turned ON, the device will wake-up and start to blink the LED in case the logbook mode is PRIVATE. This variant is more tolerant against cases where the driver pressed the button by accident. The private mode can be easily left with the next ignition ON.

Figure 5:
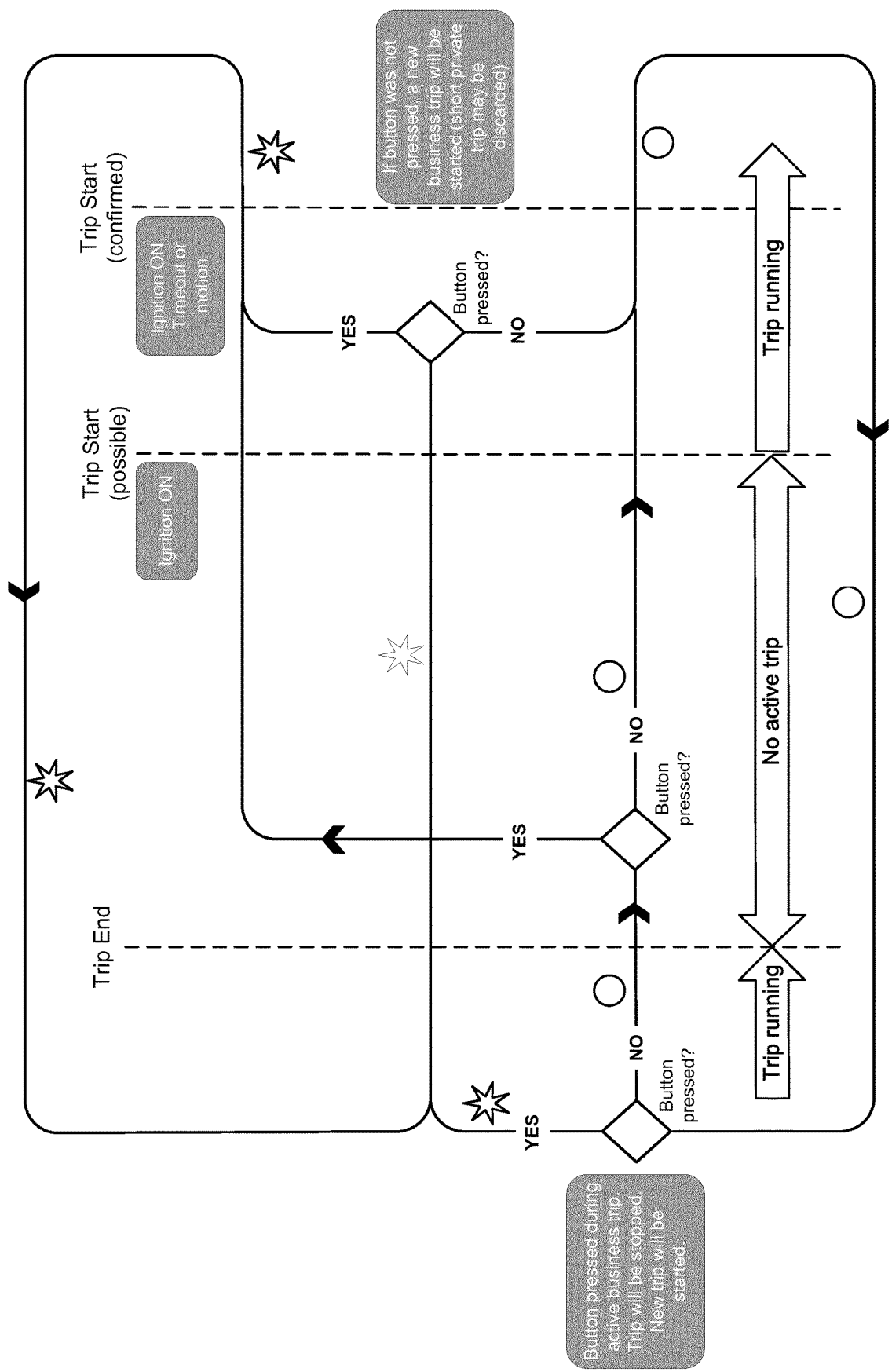
FIG. 5 illustrates a flow diagram of operations taken by a wireless communication device in accordance with an embodiment of the invention.

In the second variant—the trip based variant—the wireless communication device includes one push button and one LED. The method of this variant is shown in FIG. 5. The logbook can be set to PRIVATE via the button during or after a trip and it will be automatically reset to BUSINESS in case the user did not press the button after ignition ON/trip start. If the button is pressed during a business trip, the business trip will be finished and a new private trip will be started. The time frame to press the button after ignition ON is valid until vehicle motion starts or until the ignition ON message is sent (per default after 5 minutes). If the button is pressed, the logbook will remain in PRIVATE mode. The LED indicates the private mode (LED is ON), the business mode (LED is OFF), as well as the prompt to press the button after ignition ON/trip start in case of PRIVATE mode (LED is blinking). To save vehicle battery current during device sleep mode, it is possible to configure the device, that the LED shall be switched OFF during sleep mode. As soon as the ignition is turned ON, the device will wake-up and start to blink the LED in case the logbook mode is PRIVATE.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims. For example, whilst embodiments described in the foregoing detailed description refer to the use of a smartphone (or other similar mobile telecommunications device) to transfer data to and from the OBD dongle and server, it will be appreciated that any suitable form of gateway (or Internet-enabled device) may be used to provide the necessary connection. For example, the device, e.g. OBD dongle, may communicate wirelessly with a computing device, such as a portable computer, laptop, or other similar mobile device, which in turn communicates with the server using any suitable means, e.g. via the telecommunications network.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specially enumerated in the accompanying claims at this time.

The invention claimed is:

1. A method of operating a wireless communication device installed in a vehicle to transmit data indicative of trips made by the vehicle to a remote device, the wireless communication device including or being operatively connected to a position determining device, the method comprising steps carried out by the wireless communication device as follows:
   determining an ignition state of the vehicle, wherein said ignition state includes at least an ignition 'on' state, wherein a first time at which said ignition state is transitioned into said ignition 'on' state is stored in memory;
   defining a first time window of a first non-zero duration that begins prior to said first time and ends at said first time and a second time window of a second duration that begins at said first time and ends at a second time;
   enabling first user input only during the first time window and the second time window, via an input device operatively connected to the wireless communication device;
   selectively characterizing a current trip based on said first user input or omission thereof as being of a first type or otherwise of a second type;
   periodically transmitting a position of the vehicle as determined by the position determining device during the current trip to the remote device when the current trip has been characterized as the first type;
   disabling the periodic transmission of the position of the vehicle as determined by the position determining device during the current trip to the remote device when the current trip has been characterized as the second type;
   generating a message indicating whether the current trip is characterized as the first type or as the second type; and
   wirelessly transmitting, at least when the current trip is characterized to be of the first type, the generated message to the remote device via the wireless communication device.

2. The method of claim 1, wherein the wireless communication device is communicably connected to an ignition switch of the vehicle, and wherein determining said ignition 'on' state comprises receiving a signal from the ignition switch indicating the ignition state of the vehicle.

3. The method of claim 1, further comprising determining a voltage at a connector of said wireless communication device, via a voltage sensor on or in the vehicle operably connected to the wireless communication device, wherein said connector is installable into an on-board diagnostics (OBD) port of the vehicle, and wherein determining said ignition 'on' state comprises detecting when said voltage at the connector exceeds a predetermined voltage threshold.

4. The method of claim 1, further comprising determining a start and an end of each trip made by the vehicle.

5. The method of claim 4, wherein each trip is determined to have started when the ignition state is determined to transition to the ignition 'on' state and remains in the ignition 'on' state for more than a predetermined third duration after the first time.

6. The method of claim 4, further comprising:
   determining a velocity state of the vehicle, via a velocity sensor on or in the vehicle operably connected to the wireless communication device, wherein said velocity state includes at least a velocity 'stationary' state, wherein a third time at which said velocity state is transitioned into said velocity 'stationary' state is stored in said memory, and wherein each trip is determined to have ended when the velocity state is determined to transition to the velocity 'stationary' state and remains in the velocity 'stationary' state for more than a predetermined fourth duration after the third time; and/or wherein said ignition state includes at least an ignition 'off' state, wherein a fourth time at which said ignition state is transitioned into said ignition 'off' state is stored in said memory, and wherein each trip is determined to have ended when the ignition state of the vehicle remains in an ignition 'off' state for more than a predetermined fifth duration after the fourth time.

7. The method of claim 1, wherein one of: (i) the first type of trip is a 'private' trip and the second type of trip is a 'business' trip; or (ii) the first type of trip is a 'business' trip and the second type of trip is a 'private' trip.

8. The method of claim 1, wherein the first time window is of a fixed non-zero first duration wherein each first user input into the input device is timestamped and stored in said memory, wherein upon the first time being determined the first non-zero duration is subtracted from the first time to determine a start of the first time window, wherein the timestamped first user input is compared to the start of the first time window and the first time to determine whether the timestamped first user input was made during the first time window, wherein the timestamped first user input is then compared to the first time and the second time to determine whether said timestamped first user input was made during the second time window, and wherein the timestamped first user input is ignored when it is determined that it was not made during the first time window or the second time window.

9. The method of claim 1, further comprising:
determining a velocity state of the vehicle, via a velocity sensor on or in the vehicle operably connected to the wireless communication device, wherein said velocity state includes at least a velocity 'moving' state and a velocity 'stationary' state, wherein the second time is determined to be when the velocity state transitions out of the velocity 'stationary' state and into the velocity 'moving' state, and wherein the second time window is of a variable second duration starting at the first time and ending at the second time.

10. The method of claim 1, wherein said ignition state includes at least an ignition 'off' state, and wherein one or both of the first time window and/or the second time window is/are redefined each time the ignition state is detected to have switched from the ignition 'off' state to the ignition 'on' state.

11. The method of claim 10, wherein the one or both of the first time window and/or the second time window is/are redefined only when the ignition state is detected to have switched from the ignition 'off' state to the ignition 'on' state and there is no active current trip.

12. The method of claim 1, further comprising providing an indication to a user using one or more output devices of the wireless communication device, wherein the indication indicates to the user at least one of: (i) some or all of the first time window and/or the second time window during which the first user input is enabled; (ii) whether there is no active current trip or there is an active current trip; and/or (iii) whether the current trip is characterized as the first type or as the second type.

13. The method of claim 1, further comprising;
enabling second user input only when the current trip is characterized as the second type, via the input device operatively connected to the wireless communication device, wherein the second user input ends the current trip of the second type and starts a new current trip that is characterized as the first type.

14. The method of claim 1, wherein the wireless communication device is configured to determine a distance travelled by the vehicle during the current trip by utilizing the position of the vehicle over time as determined by the position determining device, and to include the distance traveled within the message.

15. The method of claim 1, wherein the remote device comprises a server of a telematics service provider.

16. A wireless communication device installable in a vehicle, comprising:
a processor configured to:
determine an ignition state of the vehicle, wherein said ignition state includes at least an ignition 'on' state, wherein a first time at which said ignition state is transitioned into said ignition 'on' state is stored in memory;
define a first time window of a first non-zero duration that begins prior to said first time and ends at said first time and a second time window of a second duration that begins at said first time and ends at a second time;
enabling first user input only during the first time window and the second time window, via an input device operatively connected to the wireless communication device;
selectively characterize a current trip based on said first user input or omission thereof as being of a first type or otherwise of a second type; and
generate a message indicating whether the current trip is characterized as the first type or as the second type;
the wireless communication device further comprising a wireless transmitter configured to communicate with a remote device, wherein the wireless transmitter is configured to wirelessly transmit the generated message to the remote device at least when the current trip is characterized to be of the first type; and
the wireless communication device including or being operatively connected to a position determining device, the wireless communication device being configured to periodically transmit the position of the vehicle as determined by the position determining device during the current trip to the remote device when the current trip has been characterized as the first type, and to disable the periodic transmission of the position of the vehicle as determined by the position determining device during the current trip to the remote device when the current trip has been characterized as the second type.

17. A non-transitory computer readable storage medium storing instructions that, when executed by at least one processor of a wireless communication device installed in a vehicle, the wireless communication device including or being operatively connected to a position determining device, cause the wireless communication device to perform a method for transmitting data indicative of trips made by the vehicle to a remote device, the method comprising steps performed by the wireless communication device as follows:
determining an ignition state of the vehicle, wherein said ignition state includes at least an ignition 'on' state, wherein a first time at which said ignition state is transitioned into said ignition 'on' state is stored in memory;
defining a first time window of a first non-zero duration that begins prior to said first time and ends at said first time and a second time window of a second duration that begins at said first time and ends at a second time;

enabling first user input only during the first time window and the second time window, via an input device operatively connected to the wireless communication device;

selectively characterizing a current trip based on said first user input or omission thereof as being of a first type or otherwise of a second type;

periodically transmitting a position of the vehicle as determined by the position determining device during the current trip to the remote device when the current trip has been characterized as the first type;

disabling the periodic transmission of the position of the vehicle as determined by the position determining device during the current trip to the remote device when the current trip has been characterized as the second type;

generating a message indicating whether the current trip is characterized as the first type or as the second type; and wirelessly transmitting, at least when the current trip is characterized to be of the first type, the generated message to the remote device via the wireless communication device.

\* \* \* \* \*